Aug. 4, 1964  W. VOM DORP  3,143,021
ROTARY SAW
Filed Sept. 19, 1962  5 Sheets-Sheet 1

Inventor
Walter vom Dorp
By his attorneys
Howson and Howson

Aug. 4, 1964  W. VOM DORP  3,143,021
ROTARY SAW
Filed Sept. 19, 1962  5 Sheets-Sheet 2

Inventor
Walter vom Dorp
By his attorneys
Howson and Howson

Aug. 4, 1964 W. VOM DORP 3,143,021
ROTARY SAW
Filed Sept. 19, 1962 5 Sheets-Sheet 3

Inventor
Walter vom Dorp
By his attorneys
Howson and Howson

Aug. 4, 1964 W. VOM DORP 3,143,021
ROTARY SAW
Filed Sept. 19, 1962 5 Sheets-Sheet 4
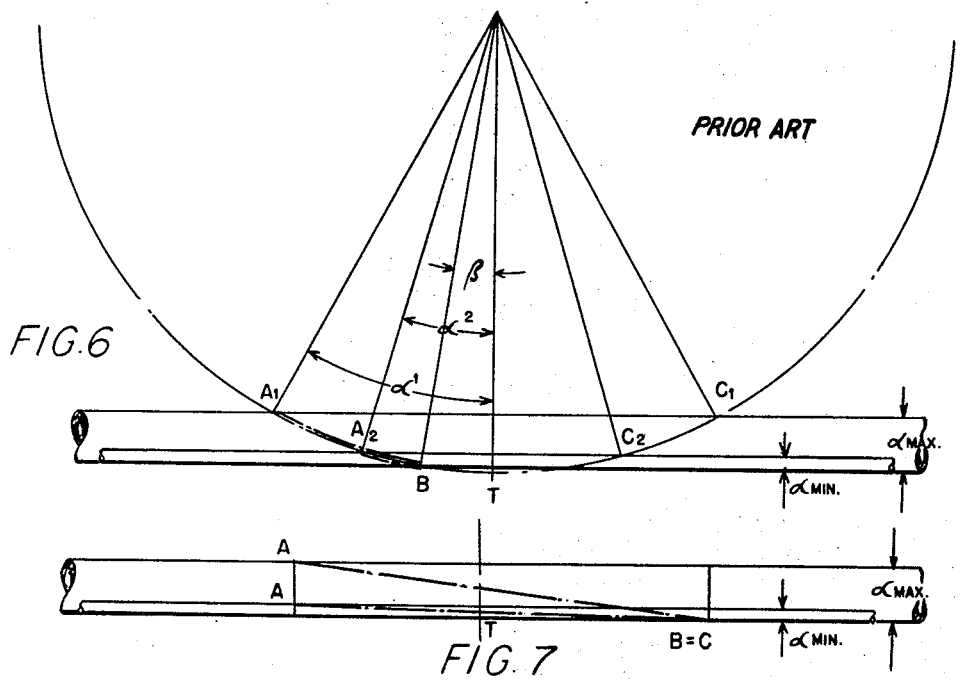
FIG.6 PRIOR ART
FIG.7
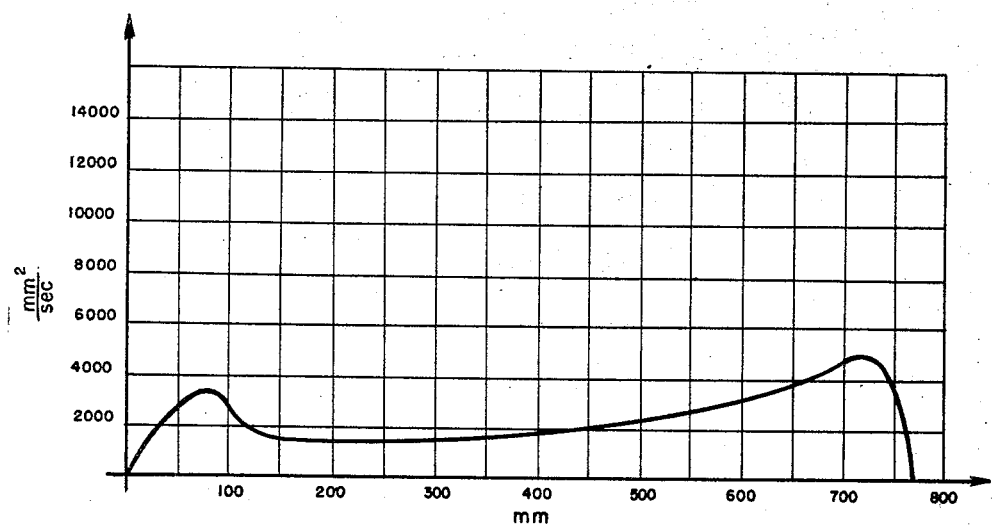
FIG.8
Inventor
Walter vom Dorp
By his attorneys

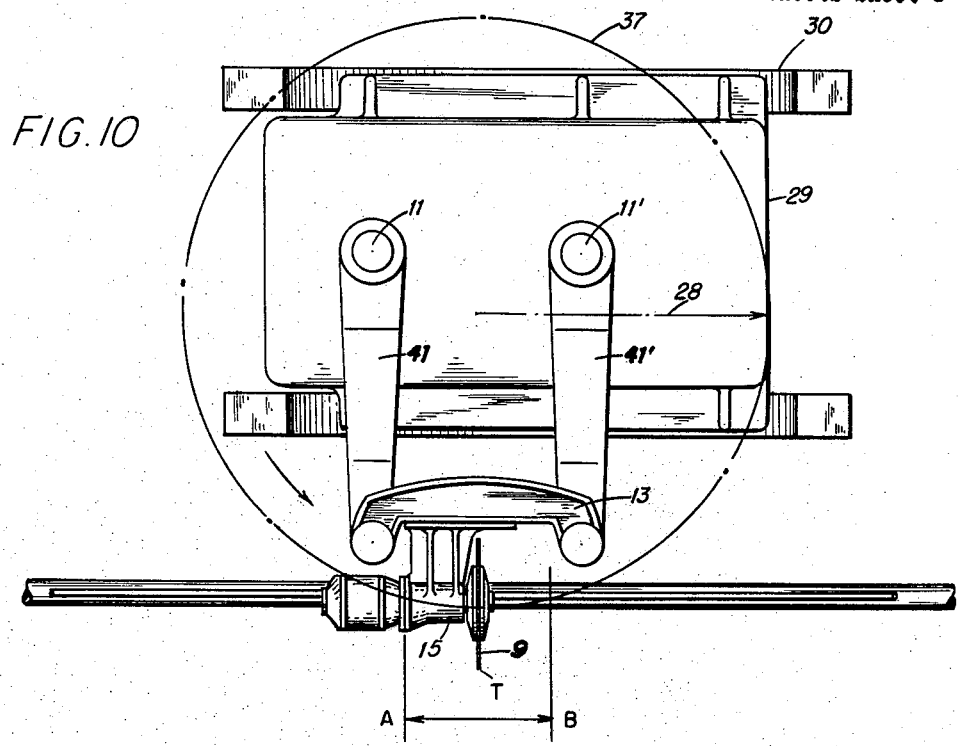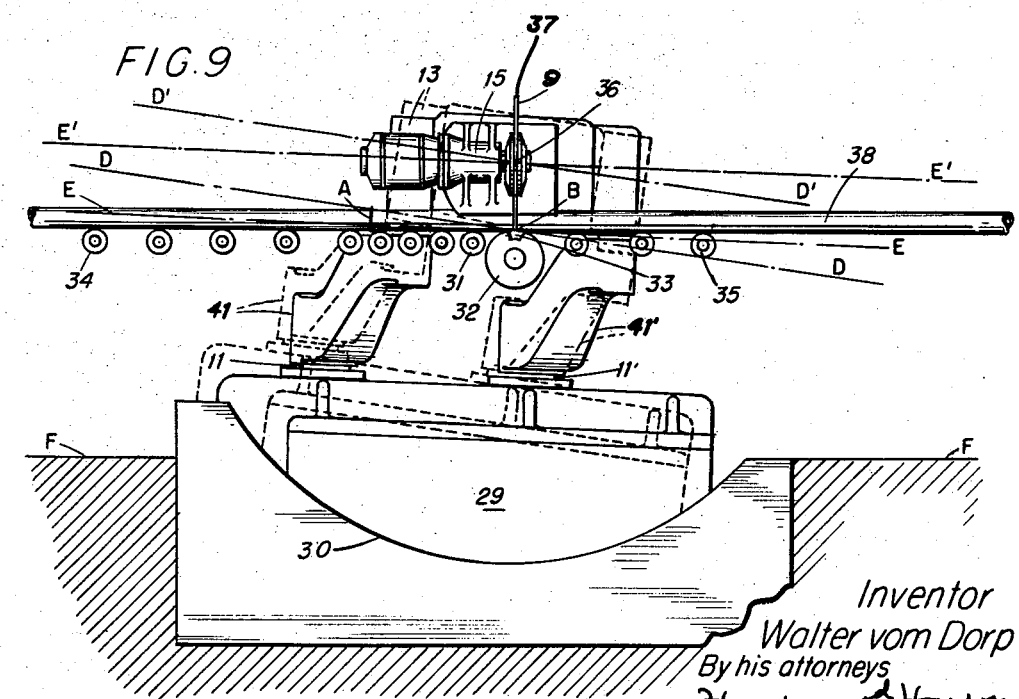

United States Patent Office 3,143,021
Patented Aug. 4, 1964

3,143,021
ROTARY SAW
Walter Vom Dorp, Rheydt, Germany, assignor to Mannesmann-Meer Aktiengesellschaft, Dusseldorf, Germany, a company of Germany
Filed Sept. 19, 1962, Ser. No. 224,766
6 Claims. (Cl. 83—329)

This invention relates to a rotary flying saw to cut into suitable lengths material being processed after a furnace or rolling mill and more particularly the cutting of tubes being received at constant speed from the rolling mill. It will be recognized that with this set-up, where the rotary flying saw intermittently goes through its cutting cycle to produce the desired length of tube, the saw always has to cut the same amount of cross sectional material in the given period of time of the cycle of the rotary saw. This is true whether the tube material is large or small; e.g., large diameter tubes with thick wall or small diameter tubes with correspondingly thinner walls, all being discharged from the rolling mill at the same speed. Or it may consist of tubes having uniform wall thickness but of varying diameters in which case the tube material is discharged from the mill at a speed inversely proportional to the diameter. If the tube is discharged from the rolling mill at a uniform speed the feeding speed of the saw obviously is proportional to the diameter of the tube at the same cutting speed and if it is the diameter which is being varied and the wall thickness remains the same, the cutting speed will be proportional to the diameter at equal feeding speed in order to obtain an equal length of the saw cutting travel.

Heretofore, it has been impossible to fulfill the above mentioned optimum conditions, especially with regard to the feeding speed—the cutting travel being dependent upon the conditions of the design. As is well known, the flying saws used described a circular orbit of travel and the required maximum feed distance or travel determines the radius of the crank of the flying saw. We here refer to the part of the orbit which is covered by the saw when running through the feed track. This part of the orbit fixes an unfavorable characteristic in that there is a high feeding speed at the beginning of the cut and a very low speed at the end of the cut. This difference in speed increases and the unfavorable conditions get worse the wider the diameter range of the material to be cut. Referring, for example, to FIG. 6 of the drawings where the dead center T is in the radius standing vertically on the longitudinal axis of the material to be cut, it will be seen that the feed travel and the speed at this point amount to zero in the direction of travel of the material so that the end of the circular part of the down-feeding arc has the lowest possible feeding speed and there is a necessary slowing-down travel between constant angle beta of approximately 8 to 10 degrees (see FIG. 6). On the other end the beginning A of the cutting is defined by the maximum diameter to be cut and the higher feeding speed in the direction of travel of the tube to be cut. Such designs as are in use have this point A; i.e., the beginning of the cut defined by the maximum angle delta at approximately 30 degrees. They cause unfavorable cutting conditions as can be seen in FIGS. 1 and 2 of the drawings where curve I represents the unit stress of the saw, curve III shows the feeding speed of the saw blade in relation to the speed of travel of the saw.

In practice, up to the present, the speed of production from furnaces or tube rolling mills was solely dependent on the capacity of the saw and other equipment which operate on the tube material after the mill. The known saws are momentarily loaded with a multiple of the allowable average stress and therefore the application of economically and technically possible higher rolling speeds is limited by the cutting capacity per tube in any given situation. The purpose of the present invention is to provide a rotary saw which while it has a cutting power per cut that is considerably lower than usual, is smaller or at least equal, at much higher speeds, to carry out cutting at higher speeds. According to the invention this is achieved with a rotary flying saw and cutting stroke which is moved longitudinally at a given rolling speed by means of a saw blade supported on a holder where the saw blade is always guided perpendicularly to the direction of the movement of the material to be cut on a circular orbit which is closed and in which plane of travel of the saw can be inclined with regard to the center line of the rolled product and adjusted for any diameter of tube or other material in such a way that the circular arc covered during the cutting part of the orbit always has the same length and is distributed on both sides of radius of travel which stands vertically on the center line of the rolled product. It has been found that the effective cutting work on a saw travel which is three to four times longer will give appropriate reduction of the saw load stress and give a practically uniform saw feeding speed determined by the inclination of the plane of travel of the saw. Moreover, in accordance with this invention the peak load occurs at the beginning and ending of the cutting tube but contrary to prior practice this causes the higher specific load of the saw to occur in the area at the end of the cut.

In flying saws heretofore known the plane of the saw blade has been in the plane of the cut desired to be made in the moving tube. In accordance with the present invention a longer path of travel has been obtained for the saw by arranging the parts so as to keep the plane of the saw blade out of the plane of the cut. Two examples or embodiments of this broad method will be shown in this application. In one case the saw swings through its orbital path in a plane slightly inclined to the horizontal position assuming that the tube to be cut is moving horizontally and in the other embodiment the saw swings through its orbital path in the horizontal position in an extended path of movement. In both cases the periphery of the saw blade has a longer path of travel than the cut and the desirable results above referred to can be obtained. It so happens that in both the embodiments shown the orbital path in the line of cutting is shown as a straight line but this need not necessarily be so although it is the preferred embodiment.

It might also be noted that in flying saws heretofore known the cutting has been obtained between the first point of contact between the saw teeth and the tube as the saw descends and the position represented by a vertical radius dropped from the composite center of the orbital saw to the tube. It has heretofore been known to lengthen the cut in time by means of chain saws to enable the cutting to proceed beyond this vertical radius through an additional arc equal to the arc between the first point of contact of the saw teeth and the vertical radius. This doubles the cutting length and time but it has been heretofore considered impossible to adapt this to a flying saw construction where there is an intermittently operated orbital path. According to the present invention this increase in length of travel due to cutting on both sides of the vertical radius rather than using the portion beyond the vertical radius to withdraw the saw blade from the tube as shown in FIG. 7, can now be used to continue the cutting operation beyond the vertical radius when the plane of the saw is approximately in a horizontal position as in the two embodiments shown and described and in the plane of the cut.

Two embodiments are shown and described in the drawings.

FIGS. 1 to 5 are the first embodiment and FIG. 6 is a diagram of the prior art. FIG. 7 applies to both embodiments. FIGS. 8, 9 and 10 are the second or preferred embodiment.

In the drawings FIG. 1 is a graph showing the stresses on the saw blade at different points in the cutting operation. The curve numbered I is the curve of the prior art, the curve numbered II showing the reduced stresses resulting from the use of the present invention.

FIG. 6 is a plan view of the relationship of the orbital path of the saw blade to the tube to be cut, where the orbital path is in a substantially horizontal position as per the present invention. The figure also shows different sizes of tubing to be cut.

FIG. 7 is a view in elevation of the cutting operation according to the present invention showing that the cutting occurs in equal amounts on the two sides of a radius dropped vertically from the center of the saw mounting.

FIG. 8 is a view of the graph resulting from the use of the second embodiment of the invention similar to the graph of FIG. 1 of the first embodiment.

FIG. 9 is a skeleton view in elevation showing the path of the saw blade in the second embodiment, the dash line showing being an alternate or angular setting slightly out of the horizontal dimension while FIG. 10 is a plan view of the mechanism of the second embodiment.

Figure 4:
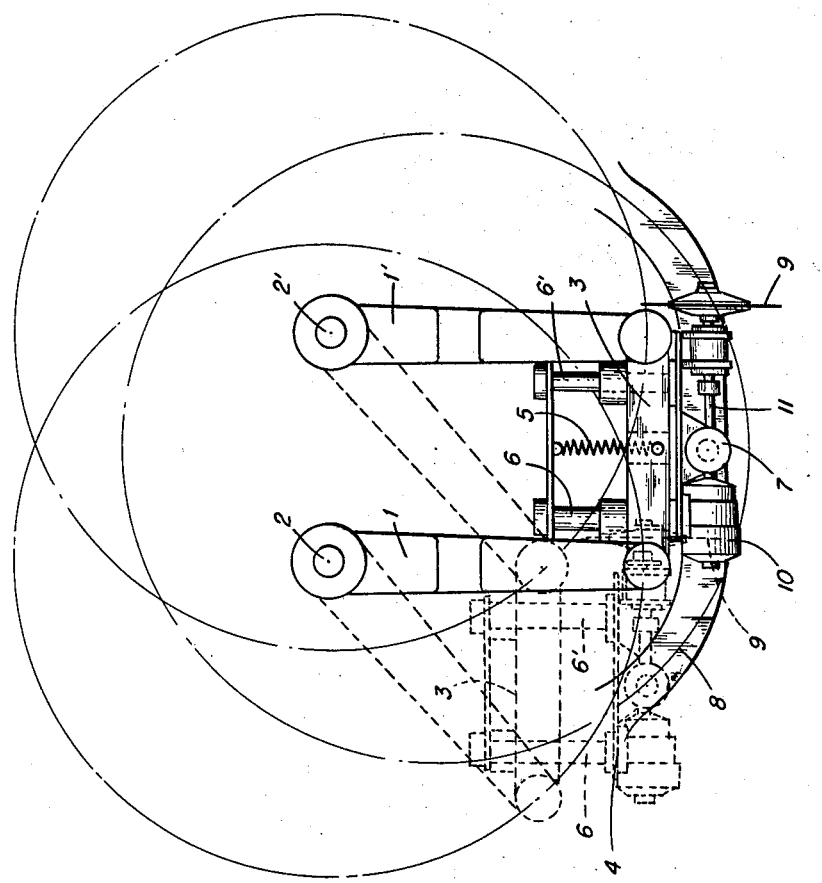
FIG. 4 is a plan view of the first saw embodiment showing its orbital path and the composite path for the saw obtained by an added or corrective movement.

Referring first to the embodiment of FIGS. 1 to 5 and FIGS. 6 and 7 there are two crank arms 1 and 1' to which a carrier 3 for the saw is attached. These crank arms turn about shafts 2 and 2' spaced from each other at the centers of revolution of the arms 1 and 1'. These arms are lying in a horizontal plane and are driven through their orbital cycle by gears (not shown) in the usual manner. The carrier 3 has associated with it a saw blade holder 4 to which is attached a tension spring 5 which tends to return the carrier 3 and holder 4 to the orbital path. The holder 4 and carrier 3 are guided vertically in the action of the spring by means of guides 6 and 6'. The corrective means contain a roller 7 and a curved guide 8. The saw blade in FIG. 4 is designated by the number 9 and is coupled to a motor 10 having universal joint shaft 11. The roller 7 is associated with the holder 4. The same effect may be produced by moving picture or other suitable equipment. It will be noted that the curved guide 8 of the corrective means straightens out the path through the roller 7.

In all cases of travel on a three dimensional stationary track a tube to be cut must execute a feed movement. This can be seen in FIG. 5 where the straight line part of the track of the saw blade 9 is marked with the letters A and C. The feed of the tube to be cut is caused by means of a saw conveyor 12 which is inclined in an upward direction to meet the saw according to the diameter of the tube. The higher or finish end of the saw conveyor 12 is trunnion-mounted on a shaft 13 mounted on a stand 14 below the conveyor. This stand 14 has mounted on the shaft 13 a conveyor roll 15 with a cutting notch 16 in its periphery. The conveyor roll is synchronized with the saw so that the saw dips into the notch as the conveyor roll rotates at the end of the cutting arc.

Figure 5:
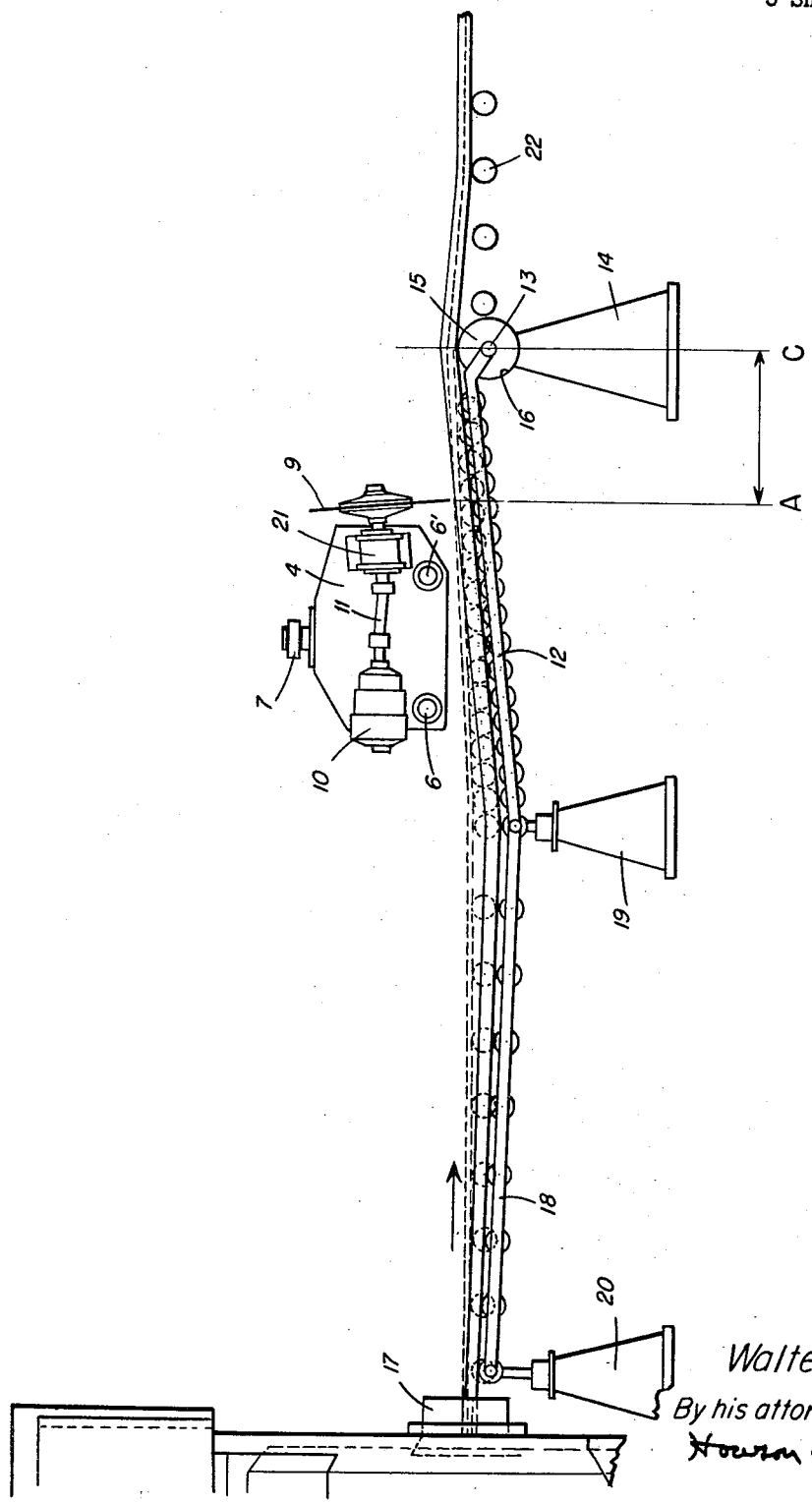
FIG. 5 is a view in side elevation of the first embodiment showing one end of a rolling mill and the conveyor carrying the tube away. The saw in its mounting is shown.

At the left of FIG. 5 is shown the outlet 17 of a rolling mill and between the outlet 17 and saw conveyor 12 is a run-out conveyor 18. This latter conveyor is arranged in a vertically adjustable way. This is done by a support stand 20 at the rolling mill end and by a support stand 19 at the point where the run-out conveyor 18 meets the saw conveyor 12. By adjusting the height of the run-out conveyor 18 at the support stand 20 at the mill end it is possible to let the conveyor receive the tube at the proper height at the outlet of the mill.

The support stand 19 where the run-out conveyor and the saw conveyor meet by adjusting the two conveyors at their point of meeting ensures that the cutting of the tube will begin at the same point A no matter what the diameter of the tube.

This arrangement also ensures that the point B at the end of the cut is always located at the conveyor roll 15. In this way the same cutting travel from A to B is obtained for each tube diameter and a uniform feed speed proportional to the tube diameter is maintained. It will be noted in FIG. 5 that there is a bearing 21 for the saw which enables it to be adjusted vertically relative to the center line of the material to be cut. The universal joint shaft 11 permits these adjustments to be made without disturbing the motor 10. It will be seen that adjustment of the saw conveyor 12 gives the approach angle of the product; i.e., the tube to the saw blade.

As already stated, the crank arms which support the saw assembly operate in a horizontal plane rather than having vertical swing as in the prior art rotary flying saws. FIG. 4 is a plan view of the swing saw assembly.

Rather than bring the saw blade out of the work, as in the past, when the tube is cut, the product or piece of tube drops from the notched conveyor roll 15 down onto a conveyor 22 and is carried away. The conveyor 22 is placed below the discharge elevation of the conveyor roll 15. Any end hooks on the cut product produce a greater bend in a larger size product than in a smaller size one. However, since conveyor 22 is slightly lower than the roll 15 the cut part of the tube will fall out of the path of the saw at once, thus relieving the saw after cutting. The length of saw conveyor 12 in this figure is inclined. Having the saw conveyor slightly inclined helps to prevent the saw picking up the product due to the cut binding on the saw blade.

In special cases it may be desirable to avoid or not to have these angular deflections. However, it has been found possible to use a flat conveyor by adjustment of the speed of the saw. Thus, in the case of a flat conveyor a small amount of speed added to the saw blade travel keeps it fractionally ahead of the speed of the tube. In this way binding is avoided in a flat conveyor. In both the inclined and flat conveyor types it is important to stabilize the slides which hold the saw blades after they leave the guide 8 at the end of a cut. This is done by means of the spring 5 shown in FIG. 4.

It will be noted that in this invention because the plane of the orbital path of the saw is inclined to an angle of more than 0° and less than 90° to a plane perpendicular to the centerline of the tube a longer path of travel is obtained. This longer path of travel reduces the stress on the saw teeth which is what is desired. In the example above described the relative relation of the plane of the orbital path to the plane perpendicular to the tube centerline is obtained by inclining the conveyor but in the preferred embodiment hereinafter described it is the plane of orbital path of the saw which is inclined instead. This relative relation is relied upon to extend the cutting arc. It should also be noted that the plane of the saw blade is parallel to the plane perpendicular to the plane of the cut.

In the example above described the relative relation is obtained by inclining the conveyor but in the preferred embodiment hereinafter described it is the cutter orbit which is inclined. This relative relation is relied on to do the cutting rather than the orbital path as in the prior art. By describing the orbital path of the saw as a first plane and remembering that there can only be three planes which are mutually perpendicular to each other it is possible to describe the relation of *the parts according to this invention and how they move.* Thus it can be pointed out that in both embodiments there is a second plane having an angular relation more than 0° and of less than 90° to the plane of the orbital path of travel of the saw.

Turning now to the preferred embodiment shown in FIGS. 8, 9 and 10, there is a circular saw 9 as in the case of the previous embodiment. The center of the saw blade is indicated by the reference numeral 36 and the travel plane of the saw is the path described by the circumference of the saw. The saw blade center and the circumference of the periphery 37 of the blade describe circular paths which are in parallel planes with the radius 28 of the saw path. These parallel circular paths are inclined with relation to the material being processed in such a way that the plane of the circular path of the periphery 37 of the saw blade is inclined in the area of the end B of the cut. Where there is a large diameter of product being rolled and cut the inclination of the saw will be along the line D—D of FIG. 9 while if the product is of small diameter the inclination in FIG. 9 will be according to the line E—E. The inclined axis of the circular track intersects the center line of the product at an angle of 90°.

For this purpose there is a gear box 29 supporting the whole saw unit which may be swiveled around the point B of a guide bed 30 as shown schematically in FIG. 9. Its drive shafts 11 and 11′ are arranged in gear box 29 in somewhat similar manner to the embodiment previously described. There are two crank arms 41 and 41′ on these drive shafts. At one end of each arm is a saw holder 4 the other ends being pivoted as coupling members.

On this saw holder the saw unit is arranged in the vertical plane swinging parallel to the center line of the product being processed, in order to allow vertical adjustment of the plane of the saw blade. Accordingly, the product is conveyed to, or cleared off, the saw by conveyor rolls 34 and 35 which are fixed in their heighth relatively to the product tube. Thus the end of cut B, which is the outlet point of the saw from the tube, has a fixed location in space relative to the diameter of the rolled product. For this reason it is possible to provide a stationary support roll 32 coordinated with the point B. This roll is synchronized with the drive of the saw and at the moment of clearing the rolled tube the saw is confronting an outlet groove 33 in the support roll 32 in somewhat similar manner to the previous embodiment. The support roll can function in such a manner with the saw, the support roll being stationary, that the tube will not be slowed down by the latter.

As shown in FIG. 9 there are the usual conveyor rolls 31 prior to the support roll 32 and discharge conveyor rolls 35 following the support roll 32. The tube is indicated in FIG. 9 by the reference character 38.

Figure 1:
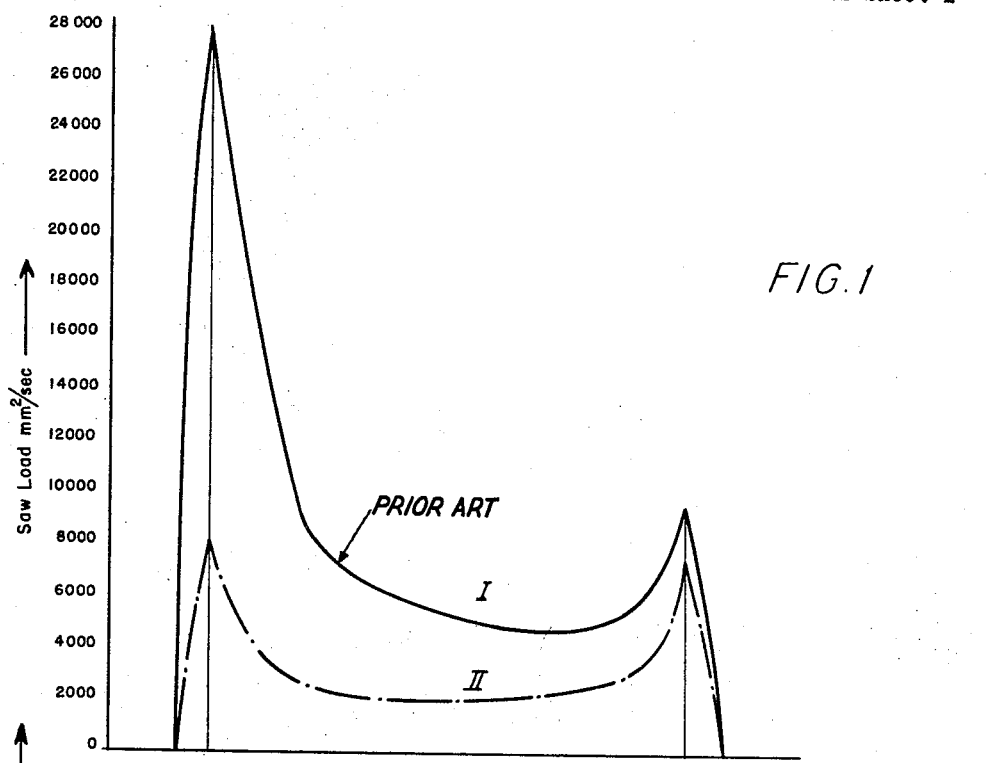
Figure 2:
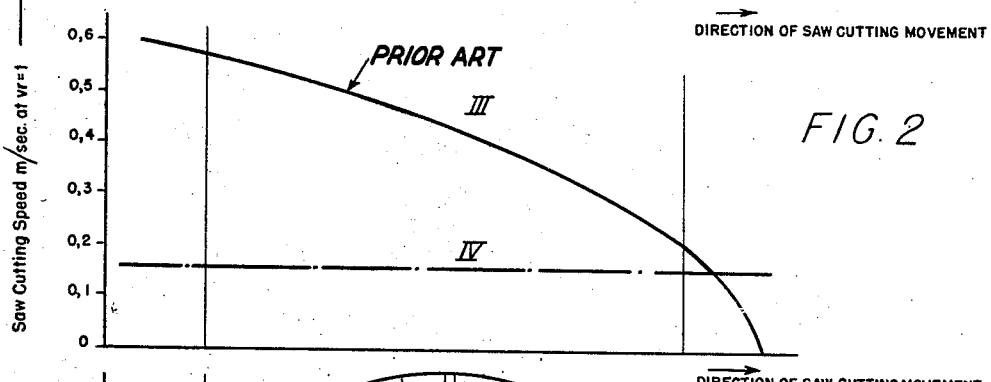
FIG. 2 is a similar graph of the speed of the saw at various points in the cutting operation, the curve III showing the prior art and the curve IV showing the speed in accordance with the present invention.
Figure 3:
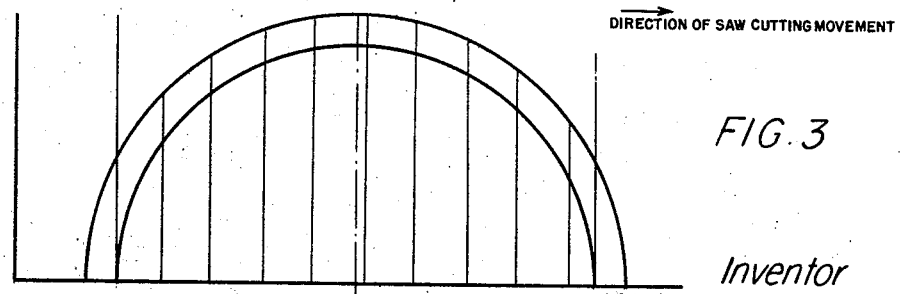
FIG. 3 is a cross sectional view of a tube so related to FIGS. 1 and 2 as to show the relationship of the various stresses to the particular points in the operation of cutting the tube.

FIG. 8 is similar to FIG. 1 but shows the stress diminution similar to graph line II of FIG. 1 but obtained from the preferred embodiment of FIGS. 9 and 10.

It will be noted that in the prior art shown on FIG. 6 the points B and C are not at the same point. In the present invention B and C are at the same point. As shown in FIG. 9 the gear is tipped relative to the floor FF of the mill.

What is claimed is:

1. A rotary saw for cutting a tube into lengths while said tube is moving at high speed along its centerline, comprising
    a rotary saw blade,
    a saw blade carrier means for moving the blade in a closed orbital path defining a plane, both said plane and a portion of said path intersecting said tube at an acute angle, said blade being mounted on said carrier means so as to meet said tube and cut it perpendicularly to its centerline during the portion of the orbital path in which it intersects said tube, said blade having an orbital velocity component in the same direction as that of the moving tube during cutting, the arclength of the orbital path during cutting being equally distributed on both sides of an orbital path radius which is perpendicular to the centerline of the tube, in combination with
    means for changing the acute angle between said tube and said orbital path plane in accordance with the diameter of the tube to be cut, so that the saw blade always begins and ends its cutting at the same points in the orbital path and the arclength of the path during cutting is always constant regardless of the diameter of the tube being cut,
    whereby the proper angle setting for each diameter of tube enables the arclength of the cutting portion of the orbital path of the saw to remain constant for tubes of all diameters.

2. A rotary saw according to claim 1, wherein said means for changing the acute angle between said tube and said orbital path plane comprises means for adjusting the inclination of the orbital path of the saw with respect to the tube.

3. A rotary saw according to claim 2, wherein additional means are provided on the carrier means for moving the saw blade in a plane vertical to the centerline of the tube so the relative positions of the tube and the saw blade may also be changed independently of the inclination of the orbital path of the carrier means, said means comprising guides for controlling the position of the saw blade on the carrier means and a gear for moving the saw blade along the guides.

4. A rotary saw according to claim 1, wherein said means for changing the acute angle between said tube and said orbital path plane comprises means for changing the inclination of the tube with respect to the plane of the orbital path of the saw.

5. A rotary saw according to claim 4, wherein there are means mounted on the carrier for changing the inclination of the saw blade according to the inclination of the tube so that the blade cuts the tube perpendicularly to its centerline.

6. A rotary saw according to claim 4, wherein said means for changing the inclination of the tube with respect to thte plane of the orbital path of the saw comprises,
    a roller bed for supporting the tube and guiding it as it moves along and
    two stands the height of each of which can be independently adjusted, one stand supporting the roller bed at one end, the other stand supporting the bed at the opposite end,
    whereby the height of the end of the roller bed nearest the rolling mill exit can be adjusted to support the tube at the axis of the rolling mill.

References Cited in the file of this patent
UNITED STATES PATENTS

| | | |
|---|---|---|
| 2,151,703 | Kaplan | Mar. 28, 1939 |
| 2,580,959 | Ropp | Jan. 1, 1952 |
| 2,618,047 | Mansell | Nov. 18, 1952 |
| 2,693,630 | Rodder | Nov. 9, 1954 |
| 2,833,024 | Boehm | May 6, 1958 |
| 2,836,880 | Chang | June 3, 1958 |
| 3,039,138 | Hall | June 19, 1962 |